United States Patent

Blendermann et al.

[19]

[11] Patent Number: 6,052,765
[45] Date of Patent: Apr. 18, 2000

[54] METHOD FOR OPTIMIZED PLACEMENT OF VIRTUAL VOLUMES ON A PHYSICAL CARTRIDGE

[75] Inventors: Stephen H. Blendermann; Alan Ray Sutton, both of Boulder, Colo.

[73] Assignee: Storage Technology Corporation, Louisville, Colo.

[21] Appl. No.: 09/063,986

[22] Filed: Apr. 21, 1998

[51] Int. Cl.[7] .................................................... G06F 12/08

[52] U.S. Cl. ................................................ 711/165; 707/7

[58] Field of Search ........................... 711/111, 118, 154, 711/165; 707/7

[56] References Cited

U.S. PATENT DOCUMENTS 5,774,716   6/1998   Harbinshi et al. ...................... 707/202

Primary Examiner—Eddie P. Chan
Assistant Examiner—Kevin L. Ellis
Attorney, Agent, or Firm—Paul M. Schwartz; Wayne P. Bailey

[57] ABSTRACT

The present invention provides a method for selectively storing data files on a multiple volume cartridge (MVC) device which maximizes the likelihood of gaps in stored data appearing at the end of a cartridge. All incoming data files are initially stored in a virtual disk buffer, and checked to determine time of expiration. The expiration information is then used to reorder the virtual data volume files when placed on the MVC device so that the last to expire is stored first, and the first to expire is stored last.

4 Claims, 2 Drawing Sheets

METHOD FOR OPTIMIZED PLACEMENT OF VIRTUAL VOLUMES ON A PHYSICAL CARTRIDGE

TECHNICAL FIELD

The present invention relates generally to multiple volume cartridge (MVC) devices, and more specifically to an improved method for optimizing efficiency of virtual volume placement on such MVC devices.

BACKGROUND ART

Generally, automated cartridge systems (ACS) provide a mechanism by which multiple users in a data processing system can have common access to multiple data storage subsystems, such as multiple volume cartridge (MVC) devices. In conventional MVC devices, transfer of data sets or files generated by remote user computer systems for storage on a particular cartridge is performed using a first-in-first-out (FIFO) placement of such data files, or volumes, on the cartridge based on the time a data file is created/transferred.

While processing is made easier, the problem with such FIFO arrangements relate to the inability to efficiently utilize the physical space on the cartridge whenever earlier stored data files expire before later stored data files. More specifically, when a data volume file is generated or transferred, the data file is tagged with a predetermined expiration time. As a result, as shown in FIG. 1(a), if five different tape data volumes TV1 through TV5 were transferred onto a first MVC 10 order of time of creation, and volumes TV2 and TV3 expire before TV4 and TV5, then unusable gaps between valid volume files occur in MVC 10 as shown in FIG. 1(b).

In order to provide some measure of recovery of such unusable gaps, known management arrangements automatically move all valid data volumes in a given MVC whenever the ratio of the amount of valid data to the total data capacity on a cartridge exceeds a predetermined threshold. Such an arrangement is illustrated in FIG. 2 where data volumes TV1, TV4, and TV5 are moved to a second MVC 12.

While moving valid data volumes does allow reclamation of unused space on the first MVC, such a solution is not fully satisfactory since there is no control to prevent the very same problem from immediately occurring again on one or both MVC 10 and 12. As a result, a need exists for an improved method for transferring or optimizing placement of data volume files onto a MVC which overcomes the inefficiencies of conventional FIFO arrangements.

DISCLOSURE OF THE INVENTION

It is therefore an object of the present invention to provide an improved method for selective placement of data volume files onto a multiple volume cartridge (MVC) device which improves efficiency of MVC space utilization.

It is another object of the present invention to provide a method for selective placement of virtual data volumes onto a MVC device which improves efficiency of MVC space utilization while also minimizing the necessity of moving data volumes between different MVC devices.

It is still another object of the present invention to provide a method for selective ordering of virtual data volumes onto a MVC device based upon the expiration times of the respective, thereby improving the likelihood that gaps in the stored data volumes will occur at the end of the MVC device.

In accordance with these and other objects, the present invention provides a method for selective placement of virtual data volumes onto a multiple volume cartridge (MVC) device which first stores all incoming data volume files in a virtual disk buffer, analyzes each volume file to determine a time of expiration, and transfers the stored virtual data files to a MVC device so that the order of storage begins with the last to expire and ends with the first to expire.

With such an arrangement, the present invention is able to keep any gaps formed by expiring data volumes at the end of a MVC, and thus reusable without requiring all data volume files be transferred or moved to another MVC.

These and other objects, features, and advantages of the present invention will be readily apparent from the following detailed description of the best mode for carrying out the invention when taken in connection with the accompanying drawings.

BEST MODE FOR CARRYING OUT THE INVENTION

Figure 1A:
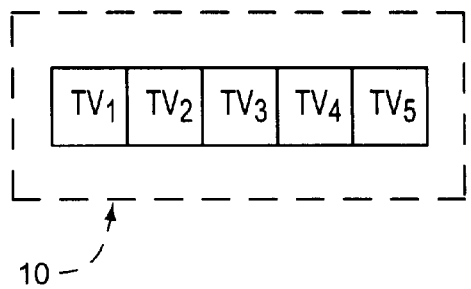
FIGS. 1(a) and (b) are diagrams illustrating conventional FIFO transfer of data volume files to a MVC device.
Figure 1B:
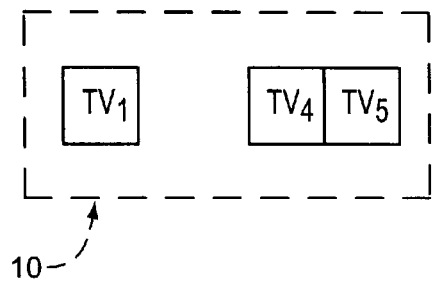
Figure 2:
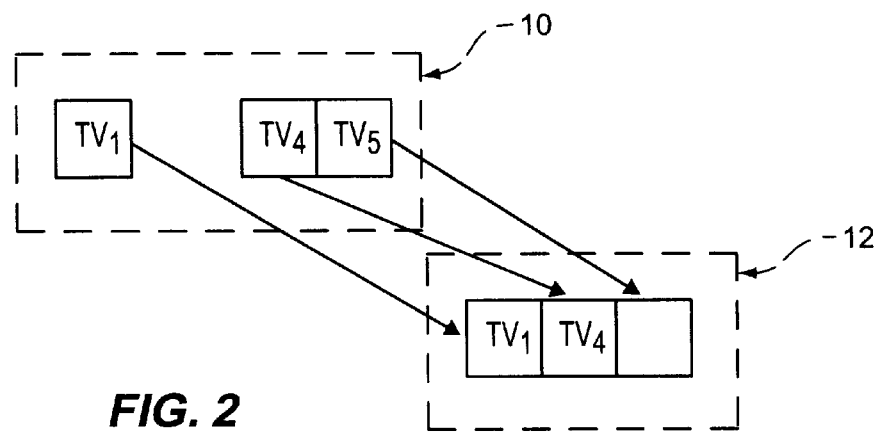
FIG. 2 is a diagram illustrating prior art movement of unexpired data files as a method of recapturing unused MVC space.
Figure 3:
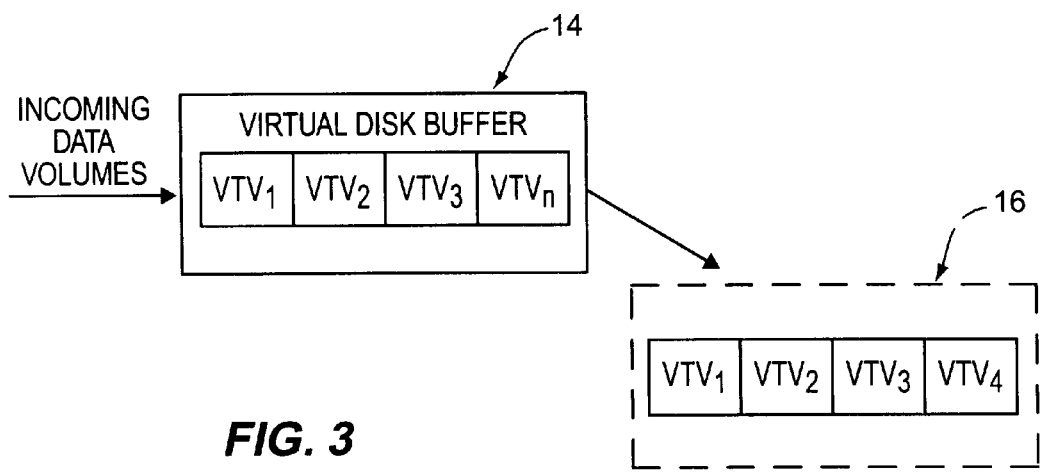
FIG. 3 is diagram illustrating selective re-ordering of virtual data volumes in accordance with the present invention.
Figure 4:
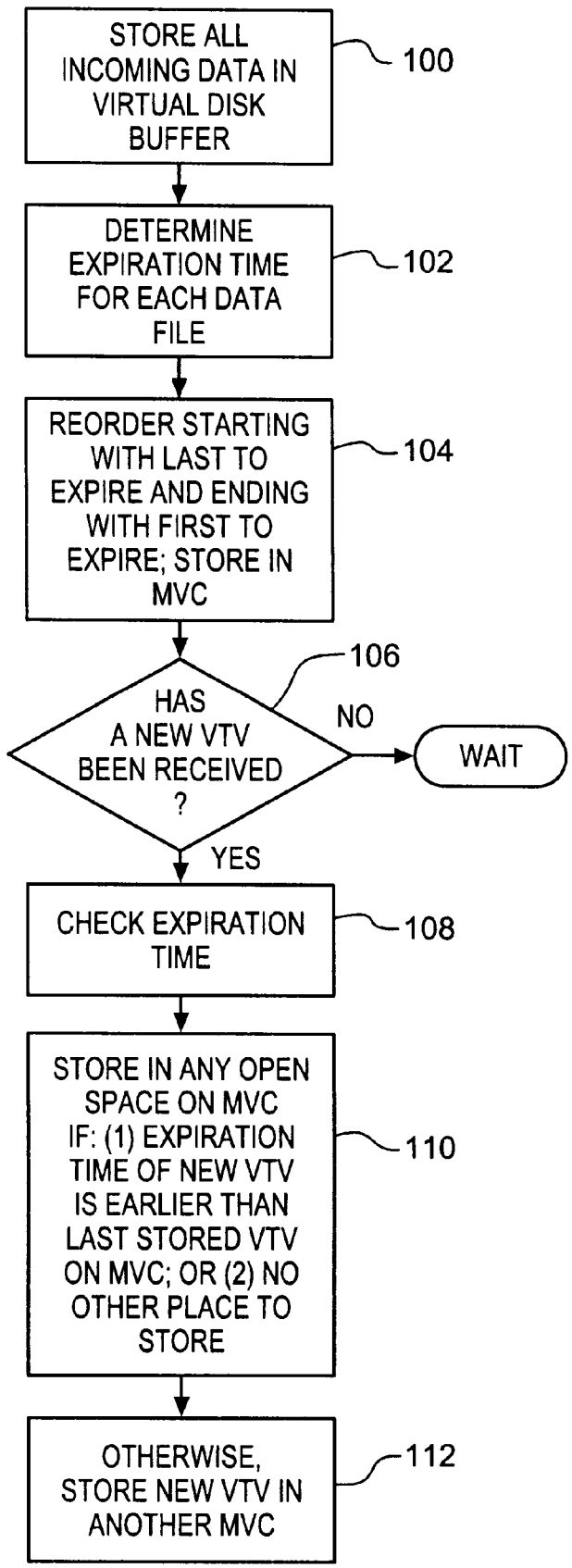
FIG. 4 is a flowchart showing process of the present invention.

The overall method of the present invention will now be described in connection with FIGS. 3 and 4. More specifically, at a block 100, all data files received from remote computer systems are initially stored as virtual tape volumes (VTV) in a virtual disk buffer 14. As is well understood to one of ordinary skill in the art, when a data file is created or transferred from a remote terminal, each data file is given a predetermined time of expiration. Such expiration information automatically is included as part of the data file. As denoted at block 102, the expiration times for each data file are determined. For illustrative purposes, the order of expiration from first to expire to last to expire is as follows: VTV2, VTV3, VTVn, and VTV1.

At block 104, each VTV1–VTVn is then stored in a MVC device 16 starting with the last data file to expire and descending to the earliest to expire. The timing of such transfer from buffer 14 to MVC 16 will be dependent on the size of each, but should be timed to maximize the total number of VTVs transferred at any given time.

As shown at decisional block 106, if a new data file is received, and space has opened up at the end of MVC 16, the expiration date of the new VTV is checked at block 108, and the new VTV will only be stored in the open space on MVC 16 at block 110 if either: (1) the new VTV expires before the last data volume, i.e., VTV3, or (2) the system has determined there is no other place to store the new VTV. Otherwise, as denoted at block 112, the new VTV is stored in another MVC device, or alternatively, all unexpired data volumes are moved to a new MVC device to make room for the new VTV. In addition, data volumes from multiple MVC devices could be transferred to the disk buffer, and subsequently reordered based on expiration times as described above and stored on a new MVC device.

Thus, the present invention advantageously provides a method for selectively placing data files on a MVC device which significantly increases efficiency of cartridge utilization by maximizing the likelihood that all gaps in the stored data will appear at the end of the cartridge. This in turn also minimizes the need to move already stored data files simply to gain access to unused space on the MVC.

While the best mode for carrying out the invention has been described in detail, those familiar with the art to which this invention relates will recognize various alternative designs and embodiments for practicing the invention as defined by the following claims.

What is claimed is:

1. A method for selectively placing data files on a multiple volume cartridge device comprising:

storing all incoming data volume files as virtual volume files in a virtual disk buffer;

analyzing each virtual volume file to determine a time of expiration indicated therein; and sorting and transferring the virtual data files from the disk buffer to the multiple volume cartridge device so that the order of storage starts with the last to expire and ends with the first to expire.

2. The method of claim 1 further comprising storing a newly received data file in any gap which appears at the end of the multiple volume cartridge due to expiration of a previously stored virtual volume file.

3. The method of claim 1 further comprising storing a newly received data file in any gap which appears at the end of the multiple volume cartridge if the newly received data file expires before the last data file already stored on the multiple volume cartridge.

4. The method of claim 3 further comprising determining that the newly received data file does not expire before the last data file already stored on the multiple volume cartridge, and storing the newly received data files in any gap which appears at the end of the multiple volume cartridge only if there is no other storage space available.

* * * * *